United States Patent

Allen et al.

[11] 3,919,900
[45] Nov. 18, 1975

[54] AUTOMATIC ROLL TENSIONING METHOD AND APPARATUS

[75] Inventors: Francis Edwin Allen, North Vancouver; Andrew Wilkinson Porter, Vancouver, both of Canada

[73] Assignee: Letson and Burpee Ltd., Vancouver, Canada

[22] Filed: Dec. 9, 1974

[21] Appl. No.: 530,875

[52] U.S. Cl. .................................. 76/27; 76/112
[51] Int. Cl.² ........................................ B23D 63/18
[58] Field of Search ........ 76/27, 104, 112; 318/466, 318/488, 489; 254/51

[56] References Cited
UNITED STATES PATENTS

| 2,334,837 | 11/1943 | Platt et al. | 76/27 |
| 2,441,648 | 5/1948 | Senard | 76/27 |
| 2,623,414 | 12/1952 | Senard | 76/27 |

Primary Examiner—Al Lawrence Smith
Assistant Examiner—Robert C. Watson
Attorney, Agent, or Firm—Carver and Company

[57] ABSTRACT

Apparatus and method for automatically roll tensioning saw as used on bandmill. Selected portion of saw is formed into known curve so that existing prestress distribution in saw causes selected portion to bow across width thereof. Saw profile is detected by a bow sensor traversing back and forth across saw, simultaneously feeding saw longitudinally, thus causing sensor to describe zig-zag locus on bowed saw face. Back crown sensor output signals reflect back crown as saw feeds past. Both sensor outputs are fed into computer where bow sensor readings are averaged and synchronized with average back crown to assess existing pre-stress distribution for that portion. Computer compare assessed distribution with desired distribution and outputs correcting signals to stretcher rolls to correct deviations of assessed distribution from desired distribution. Stretcher rolls are automatically positioned at desired location and roll with desired force at computed location on that particular portion of saw. Stretcher rolls are traversed by hydraulic positioning cylinder, and forced together by hydraulic loading cylinder, both cylinders controlled by servo valves responsive to computer output signals and signals from feedback sensors.

15 Claims, 13 Drawing Figures

AUTOMATIC ROLL TENSIONING METHOD AND APPARATUS

BACKGROUND OF THE INVENTION

1. Field of the Invention

The invention relates to an apparatus and method for automatically roll tensioning or stretching a saw to impart a residual pre-stress therein, the saw being used in bandmills or frame saws as used in the lumber processing industry.

2. Prior Art

It is well known in the art of saw filing that the performance of a band saw or a frame saw may be improved if the saw blade is first given treatment known in the trade as "tensioning" or "stretching." In essence, a band or frame saw is tensioned by expanding metal throughout the central portion of the saw usually by rolling the saw with stretcher rolls. The saw is stressed beyond its metallurgical elastic limit which results in a residual tensile stress in the outer edges of the saw and a residual compressive stress in the central portion. Hereinafter, tension, residual stress or pre-stress distribution etc. refers to a condition of the saw resulting from expansion of metal as above and not to tensile stress in the saw resulting from other causes such as force between wheels of the bandmill.

Correct pre-stress distribution also assists in maintaining central stacking of the saw on the wheels of the bandmill by substantially overcoming normal effects of "anticlastic curvature." Anticlastic curvature occurs when a saw is bent around a wheel, and the resulting tendency of the two outer edges of the saw to lift off the wheel is counteracted by correct pre-stress distribution.

For optimum sawing performance, the pre-stress distribution in the saw blade must be properly assessed and controlled. Normally pre-stress distribution in the saw is assessed by bending the saw into an arc within a plane containing the longitudinal axis of the saw to that the saw assumes a bowed cross-sectional shape or profile, which shape reflects pre-stress distribution in the saw. A circle template or straight edge is then placed transversely across the saw and the deviation or spacing of the saw from the circle template or straight edge is visually assessed, giving an indication of pre-stress distribution within the saw blade. The deviation above, known as "light slit" or "chord height," generally varies from zero at front and back edges of the saw to a maximum value of between 0.005 inches to 0.100 inches. Amount of deviation depends on blade thickness, blade width, type of the curve into which the blade is formed and the amount and distribution of pre-stress in the saw. The saw is then worked with the stretcher rolls at an estimated location on the saw and at an estimated force, and the resulting deviation again checked. Successive workings usually bring the saw profile to within the required tolerance.

It is seen that much skill and experience is required to assess and correct the pre-stress distribution in a blade using current techniques. With increasing use of thinner blades in saw mills it is becoming increasingly difficult to properly prepare saw blades for optimum performance and life.

SUMMARY OF THE INVENTION

The invention reduces difficulties of the prior art by providing an apparatus which assesses an existing pre-stress distribution in the saw and measures back crown of the saw and, through a digital computer, controls stretcher rolls to roll with a computed rolling force at a particular location on the saw to change the existing pre-stress distribution in the saw to more nearly approach a computed desired pre-stress distribution. The pre-stress distribution in the saw adjacent a particular location is assessed or visualised from the bow profile and back crown at that location by a method and apparatus of the invention which is based primarily on the prior art manual method as previously described. The invention does not attempt to assign absolute values to stresses within the saw but merely to use the physical results of these stresses, i.e. the bow profile and back crown, to indicate the distribution of these stresses. Throughout this disclosure and in the claims the terms pre-stress distribution, roll tension etc. refer to varying distribution of residual tensile and compressive stresses imparted into the saw by normal conventional roll tensioning and conventional operating conditions of the saw. Once the parameters of the particular saw have been fed into the computer, the apparatus operates automatically so that, with several passes of the saw, the pre-stress distribution in the saw is brought to within a desired tolerance.

A saw to be worked has a longitudinal axis and an effective width defined by space between edge data of the saw and is adapted to be fed along the longitudinal axis thereof. The apparatus according to the invention includes support means, blade forming means, bow detecting means, a back crown gauge, a computer, and a tensioning means. The support means mounts the saw to permit movement of the saw along the longitudinal axis. The blade forming means forms a selected portion of the saw into a known curve so that existing pre-stress distribution in the saw causes the selected portion of the saw to bow across the width thereof relative to a face datum to assume a bowed profile. The bow detecting means detects bow of the selected portion of the saw relative to the face datum, and has an output responsive to position of the saw face relative to the edge and face data so as to reflect existing pre-stress distribution local to the selected portion of the saw. The back crown gauge cooperates with one edge of a portion of the saw so as to measure back crown at that portion, the back crown gauge including a back crown sensor having an output reflecting back crown of the saw. The computer has input connections, through an interface, to the outputs of the bow detecting means and the back crown gauge, the output from the back crown gauge being synchronized with the output from the bow sensing means for that particular portion of the saw. The computer is programmed to assess, from the inputs, the existing pre-stress distribution in the saw and to compare the assessed pre-stress distribution with a theoretical desired pre-stress distribution so as to produce an output reflecting the difference between the assessed and the desirable pre-stress distributions local to the selected portion of the saw. The tensioning means cooperates with the saw and has inputs connected to the output of the computer so as to receive signals from the computer representing a particular degree of rolling force to be applied to that particular portion of the saw, at a position on the saw relative to the edge data. The degree of rolling changes the existing pre-stress distribution in the saw to approach the desired pre-stress distribution, based on differences between the actual and desired bow profiles and back crowns.

A detailed disclosure following, related to drawings, described a preferred embodiment of the apparatus and method of the invention, which however are capable of expression in structure and method other than those particularly described and illustrated.

DETAILED DISCLOSURE

Figure 1:
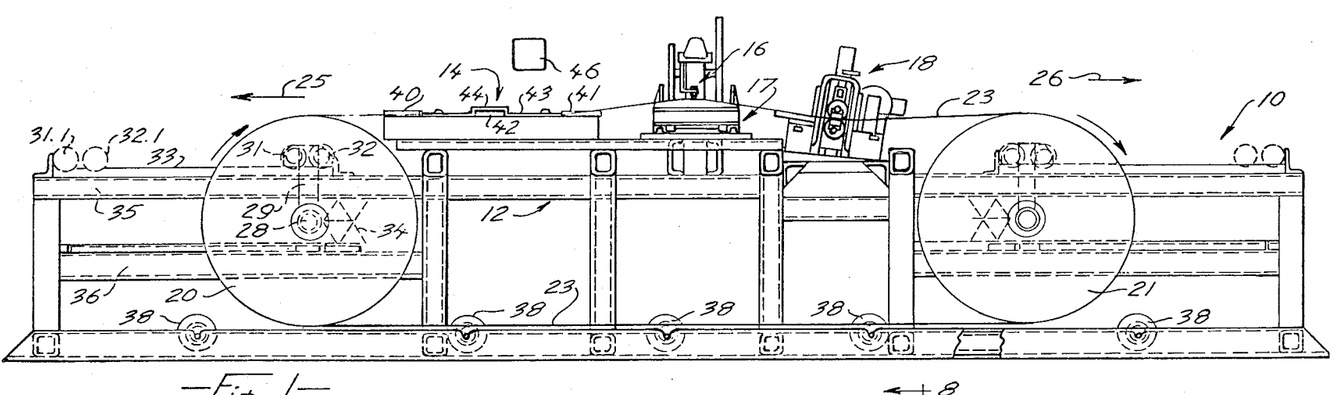
FIG. 1 is a simplified side elevation of an apparatus according to the invention.
Figure 2:
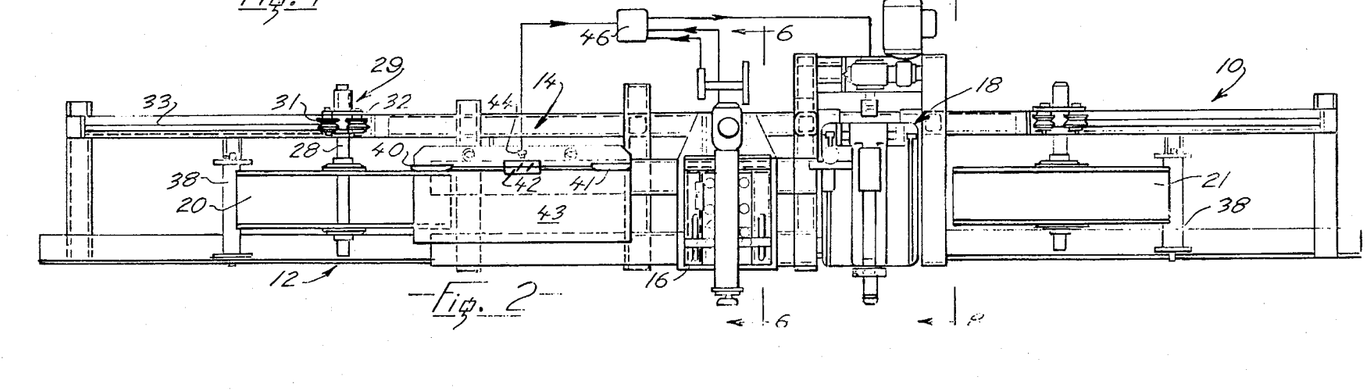
FIG. 2 is a simplified top plan view of the apparatus.

FIGS. 1 and 2

An apparatus 10 according to the invention has a bench 12 supporting a back crown gauge 14, a bow detecting means 16, a blade forming means 17 and a roll tensioning means 18. The bow detecting means 16 cooperates with the blade forming means 17, both of which are to be described with reference to FIGS. 6 and 7; and the roll tensioning means 18 is to be described with reference to FIGS. 8 - 10. A pair of spaced mounting wheels 20 and 21 are provided at opposite ends of the bench and support a saw 23 running on the wheels, an upper run of the saw passing through the gauge 14, the bow detecting means 16, the forming means 17 and the tensioning means 18. The saw 23, shown in FIG. 1, is of a type as used on a bandmill used in the lumber industry, and can be either single cut (i.e. teeth on one edge) or double cut (i.e. teeth on both edges). The wheels are shown in a minimum spaced apart position, however they are moveable in directions of arrows 25 and 26 respectively towards adjacent outer ends of the bench to accommodate saws of larger circumferences.

The wheel 20 is journalled for free rotation on a spindle 28, the spindle being carried in frame member 29, shown in broken outline in FIG. 1, the upper end of the frame member being hung from a carriage carried on a pair of V-sectioned rollers 31 and 32. The rollers run on an inverted V-sectioned rail 33 extending along the top of the bench to permit the lateral moving of the spindle, and with it the wheel 20, to vary spacing between the wheels as aforesaid. A scissor-type jack 34 extends between horizontal supports 35 and 36 of the bench and is actuated manually to extend the jack to lock the spindle at a desired position. Extreme outer positions of the rolls 31 and 32 are shown in broken outline at 31.1 and 32.1. The wheel 21 is similarly mounted for longitudinal movement and is supported on similar rails at an opposite end of the bench. A lower run of the saw is supported on a plurality of free-wheeling rollers 38 extending along a lower portion of the bench between the wheels. The bench and wheels are thus support means to permit movement of the saw along a longitudinal axis thereof.

The back crown gauge 14 resembles basically some commercially available types, and has a pair of spaced aligned guides 40 and 41 which cooperate with one edge of a portion of the saw held flat against an adjacent gauge bed 43. A gauge member 42 provided between the guides is carried on a parallelogram linkage and is spring urged into contact with the edge of the saw and moves laterally to accommodate and reflect back crown. With a single cut saw, the gauge measures back crown of the back edge; with a double cut saw back crown of one edge only is measured. A back crown sensor 44 is connected to the member 42 and has an output reflecting back crown of that portion of the saw between the guides. In the common back crown gauge, the sensor is a mechanical dial gauge or equivalent, but in the gauge 14 an electronic device is substituted to provide a voltage output proportional to back crown. A linear variable differential transformer (LVDT) has been found suitable and the output of the LVDT is connected to a computer 46 as will be described with reference to FIG. 11. An LVDT having a highly linear output is preferred, a suitable type being supplied by Trans-Tek Incorporated, of Ellington, Connecticut, U.S.A., under part number 351-000. A further view of the gauge 14 appears in FIG. 13.

Figure 3:
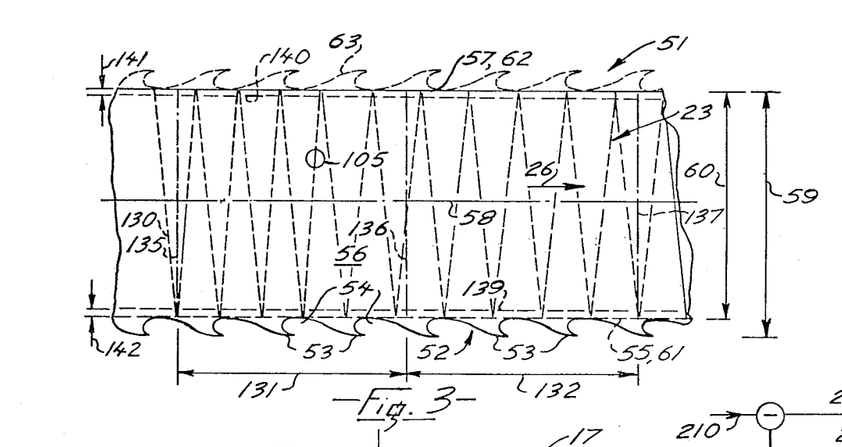
FIG. 3 is a fragmented plan of a saw blade for use with the apparatus of the invention.

FIG. 3

Nomenclature of a portion 51 of the saw 23 is to be briefly described. The saw is shown in full outline as a single cut saw having a front edge 52, provided with teeth 53, spaced by gullets 54 extending inwards to a gullet line 55. The saw has an upper face 56, a back edge 57, and front and back edge data 61 and 62 defined as the gullet line and back edge respectively. A central longitudinal axis 58 is spaced equally from the front and back edge data. True width 59 of the saw is a maximum measurement across the saw, i.e. space between teeth tips and the back edge, and effective width 60 of the saw is spaced between the edge data.

A double cut saw would have teeth provided also at the back edge (shown in broken outline at 63) and the back edge data of such a saw would be the gullet line of the back edge, shown coincident with the edge 57. Thus the data would be the respective gullet lines spaced equally from the longitudinal axis.

As previously stated, after roll tensioning the saw, metal in the central portion of the saw has been expanded or pre-stressed by stretcher or tensioning rolls to produce a residual tensile pre-stress at each edge of the saw, and a residual compressive prestress at the adjacent central portion. Degree of tensioning is generally greatest adjacent the central axis, but with a single-cut saw, to attain sufficient back crown, some roll tensioning is also applied adjacent the back edge datum to a lesser degree as is known in the trade.

FIGS. 4 THROUGH 7

Figures 6, 7:
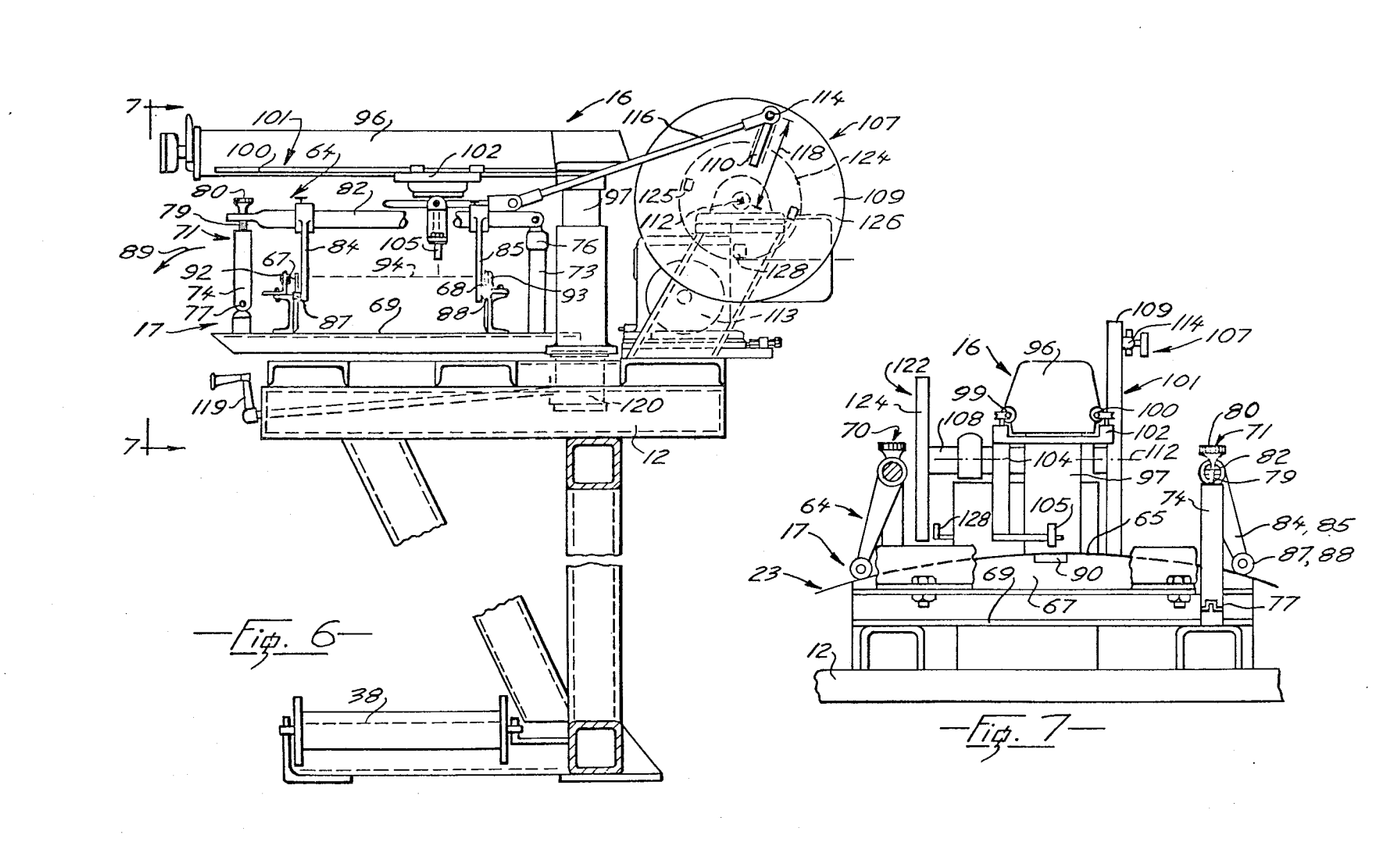
FIG. 6 is a simplified fragmented section of a bow detecting means of the apparatus as seen from 6—6 of FIG. 2, some portions being omitted.
FIG. 7 is a simplified fragmented elevation as seen from 7—7 of FIG. 6, some portions being omitted.

Referring to FIGS. 6 and 7, the blade forming means 17 has spaced similar former plates 67 and 68 having curved upper edges, the plates extending upwards from a base 69. The plates are adapted to form a selected portion of the saw 23 into the curve of the upper edges to be described with reference to FIG. 4, the saw shown only in FIG. 7. A selected portion 65 of the saw 23 is held against the former plates by hold down means including spaced similar roller mounts 70 and 71 provided at opposite ends of the former plates. The mount 71 includes a pair of vertical posts 73 and 74 extending upwards from the base 69, the post 73 having a threaded cap 76 at the upper end thereof, and the post 74 being hinged at 77 adjacent a lower end thereof. A threaded stud 79 extends from the upper end of the post 74 to accept a threaded knob 80. A transverse arm 82 is hinged at an inner end to the cap 76, and at an outer end has a longitudinal slot to accept the stud 79.

A pair of spaced, downwardly extending roller arms 84 and 85 have upper ends secured to the arm 82 and lower ends carrying rollers 87 and 88 respectively. The upper ends of the arms 84 and 85 are keyed to the arm 82 and have releasable locking means to permit sliding of the arms 84 and 85 along the arm 82 so that the rollers can be aligned with the respective former plates. When the saw is against the former plates, the rollers 87 and 88 are positioned over the former plates to sandwich the saw between the rollers and the former plates. By rotating the cap 76 to adjust height of the inner end of the arm 82, and by rotating the knob 80 to adjust height of the outer end, the force of the rollers on the saw is adjusted so that the saw can be drawn smoothly along the former plates, concurrently being held thereagainst by the rollers. The roller mount 70 is generally similar to the mount 71 so that the saw is urged against the former plates at four locations. In addition to the four rollers the hold down means can include magnets positioned along upper edges of the former plates, a typical magnet 90 being shown in FIG. 7. The magnets have sufficient force to hold portions of the saw extending between the rollers snugly against the former plates to prevent such portions bowing upwards away from the former plates. The post 74 is released from the arm 82 by unscrewing the knob 80 and swinging in direction of an arrow 89 (FIG. 6) to a lowered position, (not shown). A similar procedure is followed for releasing a corresponding post of the mount 70, which then provides clearance for the saw to be withdrawn transversely from the forming means. The procedure is reversed for fitting the saw.

Figure 4:
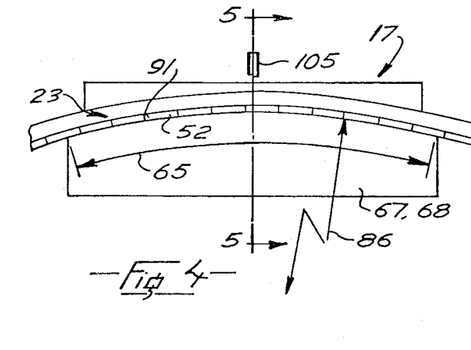
FIG. 4 is a fragmented diagrammatical side elevation showing a portion of the saw blade cooperating with a portion of the apparatus, bow of the saw being exaggerated so as to be visible over edges of the saw.

Referring to FIG. 4, the former plates 67 and 68 have upper edges, edge 91 of the plate 67 being shown. The upper edges have a known curve, suitably a portion of a circle having a radius 86 centered on a vertical central plane of the forming means. When the selected portions 65 of the saw is held against the former plates it is thus deformed into a known curve, and existing pre-stress distribution in the saw causes the selected portion to bow transversely across the width thereof to assume a bowed profile best seen in FIG. 5, the bow thereof being exaggerated in FIGS. 4 and 5.

Figure 5:
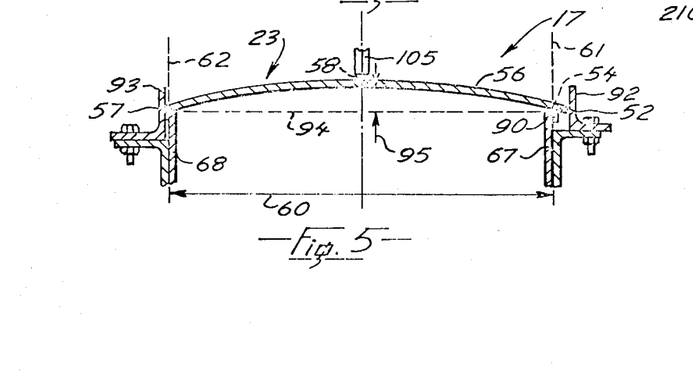
FIG. 5 is a simplified fragmented sectional diagram on 5—5 of FIG. 4, bow of the saw being exaggerated.

As best seen in FIG. 5, the former plates 67 and 68 are positioned so that the outer edges of upper portions thereof are coplanar with the edge of the data 61 and 62 respectively. Thus spacing between the former plates is generally equal to the effective width 60, and is also adjustable by means not shown to accommodate saws of different widths. Spaced edge guides 92 and 93 are releasably secured adjacent the former plates 67 and 68 respectively and are adjustable laterally so as to be fitted sufficiently closely to edge of the saw to permit free sliding of the saw between the edge guides, whilst limiting lateral movement of the saw. The blade forming means has a saw face datum 94, shown as a broken line, extending between uppermost positions of the former plates 67 and 68. The datum 94 is a horizontal axis disposed normally to the longitudinal axis of the saw and serves as a further datum from which bow measurements are taken. Thus the selected portion 65 of the saw is caused to bow upwards away from the face datum 94, having a maximum spacing 95 adjacent the axis 58 of the saw. The spacing 95, which is shown exaggerated by many orders of magnitude in FIGS. 4 and 5, is equivalent to the "light slit" or "chord height" previously referred to. Ideally the bow is symmetrical, as shown, however the profile of a saw in poor condition would appear quite different.

Referring again to FIGS. 6 and 7, the bow detecting means 16 includes a transverse arm 96 extending transversely across the saw from an upper end of a column 97. A pair of second parallel rails 99 and 100 extend along the arm and are disposed parallel to the face datum 94. A sensor carriage 102 is mounted on the rails for sliding therealong and a sensor support 104 extends downwards from the carriage and carries a vertical or bow sensor 105 at a lower end thereof. The rails serve as track means 101 extending transversely across the saw, and the vertical sensor is thus mounted on the carriage for transverse movement across the width of the saw at a constant distance from the saw face datum.

The bow detecting means 16 includes a crank means 107 having a crank disk 109 with a radial slot 110 therein. The disk is mounted on a crankshaft 108 adapted for rotation about a crank axis 112 disposed parallel to the saw longitudinal axis. The crankshaft is rotated by a motor 113, resulting in crankshaft rotation of about 25 revolutions per minute, power transmission means not shown. The crank means also includes a crankpin 114 releasably secured in the slot, and a connecting rod 116 cooperating with the carriage and the crankpin. The rod 116 is hinged at opposite ends thereof to the carriage and pin so that rotation of the crank means causes the carriage to reciprocate along the rails. Space 118 between the crankpin and crank axis is adjustable to vary throw of the crank means and thus to vary stroke of the carriage to accommodate saws of different widths. The stroke of the carriage is adjusted so that the sensor reciprocates between the edge data of the saw and describes a locus as will be described by further reference to FIG. 3. A handle 119 is connected to elevating means 120 adjacent a lower end of the column 97 for vertical raising and lowering of the support arm 96, to provide adjustment for setting of the sensor 105 vertically relative to the saw.

The vertical sensor has an output responsive to spacing between the saw face and the sensor and is preferably a non-contact or proximity type so as not to be susceptible to errors from dirt particles on the saw face. A suitable type is an eddy current proximity sensor which has the added advantage of responding only to magnetic material and thus is very selective in measurement. A suitable sensor is manufactured by Kaman Sciences Corporation of Colorado Springs, Colorado, U.S.A. under part number KD-2300-25. Alternatively an LVDT type can be used, or when the saw face is clean a contact type of linear transducer could also be used.

The bow detecting means 16 also includes an edge detector 122 having a detector disk 124 mounted on the crankshaft 108 at an end opposite to the crank means 107. The disk 124 carries a pair of diametrically opposed magnets 125 anad 126 mounted on the circumference thereof and shown in broken outline in FIG. 6. A magnetic reed switch 128 is mounted on the means 16 adjacent the circumference of the disk 124 and, in one revolution of the disk, the switch is swept successively by both magnets. The magnets are positioned on the disk relative to the crankpin 114 and the reed switch 128 so that, when the carriage 102 reaches extreme limits of its travel on the track means 101 the magnets pass the magnetic reed switch 128. Thus, with the switch 128 below the axis 112 as shown, the magnets are positioned at 90° to the crankpin 114. The reed switch is connected to the computer, as will be shown with reference to FIG. 12, so that a pulse is transmitted to the computer each time the carriage reaches an extreme limit of its stroke. Alternatively, one magnet can be fitted on the disk so that the pulse is produced at one edge data only, i.e. one pulse every two strokes.

Thus, the edge detector cooperates with the sensor 105 and is responsive to the edge data of the saw to maintain synchronization of the bow sensor output with the edge data by providing an accurate time data for the computer. The edge detector thus serves as a horizontal sensor to provide, in combination with a 100 KHZ computer clock, a means of assessing the horizontal position of the vertical sensor. In effect the edge detector synchronizes output from the sensor 105 with edge data of the saw by effectively restarting the internal clock of the computer at the beginning of each stroke or traverse of the carriage across the saw. The computer clock provides a series of highly accurate time intervals, representing equal distance increments spaced across the saw. The internal computer clock thereby provides interrupt signals to the vertical sensor so as to enable bow readings to be sampled at the equal increments across the blade. Such an arrangement limits accumulation of positional errors of the bow sensor resulting from slight inaccuracies of the crank means.

With reference again to FIG. 3, as the saw is fed in direction of the arrow 26 the sensor 105 reciprocates to and fro across the saw so as to describe a zig-zag locus shown in broken outline at 130. The stroke of the carriage is adjusted by the crank means 107, FIGS. 6 and 7, so that the sensor has outer limits of its stroke defined by the edge data 61 and 62.

Whilst the edge data 61 and 62 are outer limits of transverse of the sensor 105, readings from the sensor are taken between narrower limits 139 and 140, termed reading limits. Spaces between the reading limits 139 and 140 and the adjacent edge data 61 and 62 are termed "overhangs," and designated 141 and 142 respectively. Overhangs are used for reasons to be explained with reference to the operation of the apparatus.

Relative speeds of saw feed and sensor tracking are such that the sensor crosses the longitudinal axis 58 approximately every inch. Coarser or finer pitched tranverses can be obtained by adjustment of appropriate speeds. As will be described with reference to FIG. 12, by accepting readings from the bow sensor for sequential time periods and then averaging the readings for each period the saw is effectively divided electronically by the computer into a series of regions of known and equal lengths extending along the saw, two such adjacent regions being designated 132 and 133 respectively. Lengthwise limits of the regions are defined by length data 135 through 137. The relationship of the length data and the start and finish of each traverse of the sensor 105 is not important as transient conditions arising at the length data will be compensated by means to be described. Length data define leading and trailing edges of each region.

Figures 8, 9, 10:
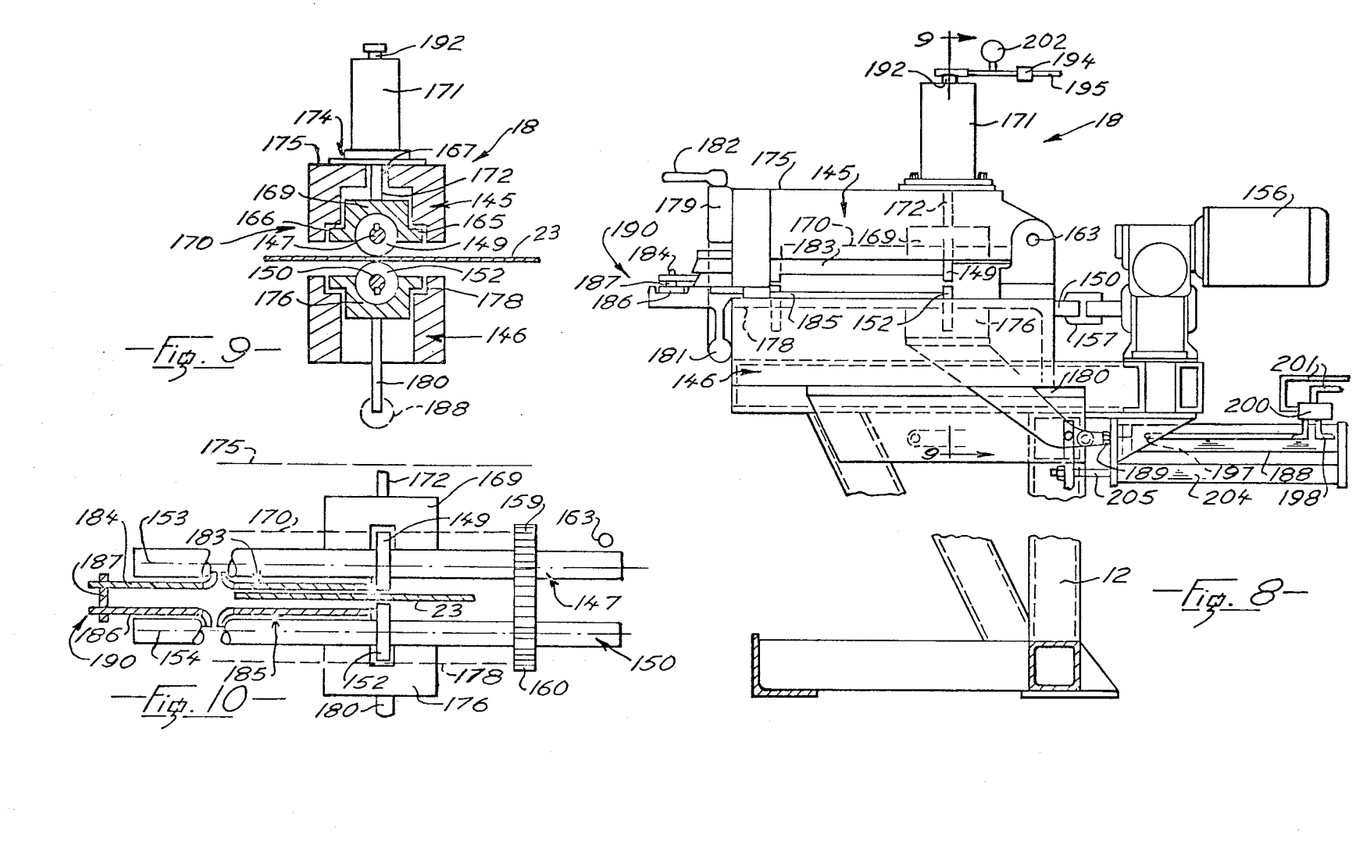
FIG. 8 is a simplified fragmented section of a saw stretching or tensioning means as seen from 8—8 of FIG. 2, some portions being omitted.
FIG. 9 is a simplified fragmented sectional diagram of saw tensioning apparatus as seen from 9—9 of FIG. 8.
FIG. 10 is a simplified fragmented diagram showing further detail of the tensioning means of FIG. 8, FIG. 11, which appears on sheet 2 of drawings, is a schematic showing a basic closed loop system associated with a feedback transducer.

FIGS. 8 THROUGH 10

The tensioning means 18 is a modified prior art stretcher roll apparatus as manufactured by Armstrong Manufacturing Company Incorporated of Portland, Oregon, U.S.A. and sold as Movable Stretcher Rolls Number 5. Therefore the basic apparatus is to be described only briefly for structure that is common to the prior art machine, and in more detail for the modifications that permit use in the present invention. In the standard stretcher apparatus as above, force applied to the rollers for stretching or tensioning the saw is applied through a manually operated lever which cooperates through a screw threaded shaft with one of the rolls so that rotation of the lever varies force between the rolls. The lever and shaft have been removed and a hydraulic loading cylinder with control means substituted. Also, in such an apparatus the pair of rolls are traversed across the saw through a manually operated chain and sprocket arrangement. The chain and sprocket device has been eliminated, and a hydraulic positioning cylinder and control means substituted. Other stretcher roll apparatus could be similarly modified, or designed to actuate in an equivalent manner.

The tensioning means 18 includes upper and lower housings 145 and 146 mounted on the bench 12 at a position aligned with blade forming means 17 to permit the saw to pass smoothly therebetween. The tensioning means 18 has in the housing 145 a first or upper spindle 147 carrying a first roll 149. and in the housing 146 a second or lower spindle 150 carrying a second roll 152. The rolls are generally coplanar and spaced to accommodate the saw 23 therebetween, and are journalled to rotate about respective roll axes 153 and 154 normal to the saw longitudinal axis, not shown. The housing is tilted (as shown only in FIG. 1) so that a portion of the saw immediately prior to entry into the rolls is perpendicular to a line joining axes of the spindles. The second spindle 150 is powered by a motor 156 through reductionn gearing and a flexible coupling 157. Spur gears 159 and 160 are mounted on the spindles 147 and 150 respectively and couple the spindles for mutual rotation. The rolls are keyed to the respective spindles and are slideable along the spindles to attain a desired position relative to the edge data of the saw so that both rolls are coplanar.

The upper housing 145 is hinged to the lower housing on a hinge pin 163 to permit swinging of the first spindle relative to the second spindle in a plane generally normal to the longitudinal axis of the saw and generally normal to the face of the saw. The position of the hinge pin relative to the spindles is selected so that, when the rolls are spaced closely to each other and in contact with the saw, limited swinging of the housing relative to each other produces a generally radial movement between the rolls. Thus the first roll is mounted for generally radial movement relative to the second roll to vary spacing between the rolls.

The upper housing 145 has a pair of spaced parallel shoulders 165 and 166 and an elongated slot 167 disposed parallel to the shoulders and extending along an upper face of the housing. A first roll carriage 169 cooperates with the first roll 149 and has a pair of spaced extending guides to engage the shoulders 165 and 166. The weight of the carriage is supported by means to be described and the shoulders and guides permit sliding of the carriage along the housing, that is transversely across the saw. Thus the shoulders serve as a first roll bed 170 extending parallel and adjacent to the first spindle to mount the carriage and roll for movement across the saw.

An extensible and retractable hydraulic fluid actuated loading cylinder 171 has a piston rod 172 connected to the roll carriage 169, the cylinder extending upwardly from an upper wall of the housing 145 and the rod extending through the elongated slot 167. A lower face of the cylinder 171 is provided with slide means 174 to permit lateral sliding of the cylinder along the housing 145, the rod 172 simultaneously traversing the slot. Thus an upper surface of the housing 145 serves as a loading cylinder bed 175 disposed parallel to the first roll bed and disposed within the vertical plane containing the spindles. The cylinder also carries a portion of weight of the carriage, the roll and spindle when the first roll is out of contact with the saw or the second roll.

A second roll carriage 176 similarly cooperates with the second roll 152 and is mounted on a second roll bed 178 in the second roll housing, the bed 178 extending adjacent and parallel to the second spindle. The spindles are journalled in the respective carriages so as to transfer radial loads between the rolls and the respective beds. By means to be described, the rolls are maintained coplanar at all times and, because the rod 172 is connected to the carriage 169 extension of the rod forces the rolls generally radially together, thus squeezing the saw 23 fitted therebetween. The cylinder 171 thus serves as roll loading means to cooperate with the first roll to move the first roll generally radially relative to the second roll to vary force between the rolls. Reaction of the force applied to the saw is transferred through the respective spindle and roll carriage to the bed of the housing thus tending to force the housings away from each other by rotation about the pin 163. The housings are held together by a reaction yoke 179 which is shown fragmented only in FIG. 8 and which has adjustment means 182 to adjust the housings relative to each other so that the roll beds are disposed parallel to each other. The reaction yoke can be swung downwardly about a lower hinge pin 181 to permit lateral insertion of the saw into the tensioning means.

An upper U-sectioned member 183 partially enclosed the first spindle 147 and is connected to the first roll carriage 169 and extends outwards from the carriage to an outer end 184. A similar lower U-sectioned member 185 partially encloses the second spindle 154 and is connected to the second roll carriage 176 and extends outwards therefrom to an outer end 186 spaced closely to the outer end 184. A connecting member 187 connects the ends 184 and 186 together so that lateral movement of one roll carriage along the spindle results in a similar and parallel movement of the other roll carriage. Thus the members 183, 185 and 187 serve as coupling means 190 extending between the roll carriages so that the carriages and rolls can slide simultaneously and maintain the rolls coplanar. The members 183 and 185 have a length sufficient to provide clearance for edges of the saw to clear on center the member 187, to permit the saw to pass cleanly between the rolls and carriages.

A roll carriage arm 180 extends downwardly from the second roll carriage 176 through an elongated space between side members of the second housing. An extensible and retractable hydraulic fluid-actuating positioning cylinder 188 has a piston rod 189 extending transversely relative to the longitudinal axis of the saw. The rod is connected to a lower end of the arm 180 so that actuation of the cylinder moves the carriage 178, and with it the roll 152, along the roll bed, that is transversely relative to the saw. This movement, through the coupling means 190 is transferred to the first carriage and roll, which movement moves the loading cylinder 171 transversely along the loading cylinder bed.

Thus the positioning cylinder 188, the arm 180, the roll carriages 169 and 176, the associated coupling means 190 serve as roll traversing means cooperating with the pair of rolls to traverse the rolls along the respective roll axes to attain a particular position of the rolls relative to the width of the saw.

As will be described with reference to FIG. 12, the roll loading means and roll traversing means each have a signal input connectable, through a suitable interface, to the computer to receive a signal from the computer reflecting the computed or desired position of the rolls relative to the edge data, and the computed or desired force to be applied by the rolls. The loading cylinder 171 has a fluid input 192, and a cylinder loading or pressure servo valve 194 is connected to the input. Hoses 195 extend from the valve 194 to a hydraulic power unit (not shown) which provides a supply of hydraulic fluid at a constant relatively high pressure of for example a nominal 1,000 pounds per square inch. The pressure servo valve has an electrical input connected to the computer and a fluid output connected to the input of the loading cylinder 171 to supply fluid at a particular pressure to the cylinder 171. The valve meters the high pressure to a reduced pressure in response to a signal from the computer reflecting the computed force to be applied to the rolls.

The positioning cylinder 188 has fluid inputs 197 and 198 at opposite ends thereof, and a positioning servo valve 200 connected to the inputs. The valve has an electrical input connected to the computer and is adapted to receive a signal from the computer reflecting the computed position of the rolls relative to the width of the saw as determined by the computer. The valve has hydraulic hoses 201 supplying pressurized hydraulic fluid from the hydraulic power pack.

The servo valves which control the positioning cylinder and loading cylinder are both operated in closed loop feedback systems. In both systems a feedback transducer is used, which as will be described with reference to FIG. 11, produces a feedback signal reflecting the new roll position or pressure. A feedback signal for the loading servo valve 194 is generated by a pressure transducer 202 which is exposed to fluid pressure within the loading cylinder, and thus reflects the roll loading. A feedback signal for the positioning servo valve 200 is generated by a linear potentiometer 204 which has a control rod 205 connected to the piston rod 189 of the positioning cylinder 188. Stroke of the rod 205 is parallel to and can accommodate full stroke of the piston 189 and thus output from the potentiometer 204 reflects the roll position. The feedback system is described further with reference to FIG. 11.

As will be described, when no additional rolling is to be applied to the saw, i.e. that portion of the saw is within tolerance or pre-stress information is not available, the rolls 149 and 152 are brought together by a low hydraulic pressure of about 200 pounds per square inch. This low pressure, termed free pressure, is sufficient to essentially eliminate slippage between the saw and the rolls so that, when the rolls are rotated, the saw is fed through the machine. Thus the rolls, when under the feed pressure, serve only as feed means and do not change the existing pre-stress distribution in the saw. Rotation of the rolls is synchronized with the computer to cooperate with the saw to feed the saw at a constant known speed. Thus the saw passes the sensing means at a constant speed to ensure synchronization of sensor output with particular regions of the saw. At the start the computer has no information relating to the condition of the saw passing through the rolls and thus feed pressure is used. When the saw is to be worked from information obtained from the means 16, the pressure is increased from the feed pressure to the amount as controlled by the servo valve. During operation the rolls are rotated at a constant speed so that the tensioning means is synchronized with the respective region of the saw. Thus, at a particular instant, a region of the saw is being roll tensioned according to the signal fed by the computer relating to a previously assessed pre-stress condition.

Figure 11:
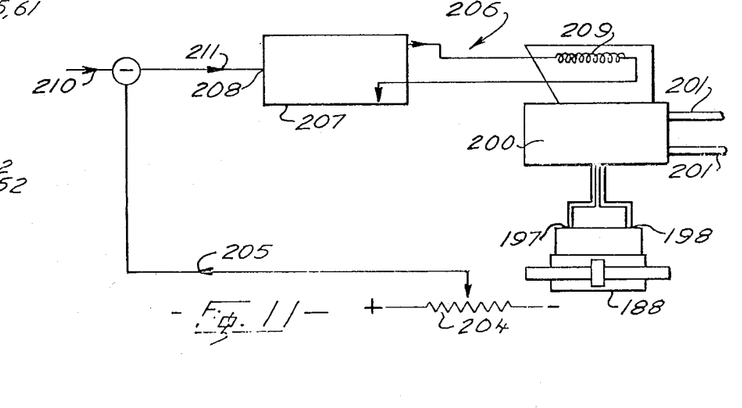

FIG. 11

A closed loop feedback system 206 associated with the positioning cylinder 188 and the positioning servo valve 200 is to be briefly described. The system has a servo amplifier 207 having an input 208, and an output connected to electrical excitation means 109 of the valve 200.

The linear potentiometer 204 produces a feedback signal 205 reflecting the new roll position which is combined with a command signal 210 from the computer, through the interface, to produce an error signal 211 which is fed into the input 208. Output from the amplifier 207, which is the error signal to the servo valve to make the rolls more nearly approach the computed position, is then fed to the servo valve 200. The valve 200 proportions fluid flow to more nearly attain the desired roller location.

A similar feedbavk system is used for the loading cylinder 171 and pressure servo valve 194. Thus both servo valves are adapted to receive signals reflecting output from the feedback transducer. The closed loop system as above described is preferred for both servo valves.

Figures 12, 13:
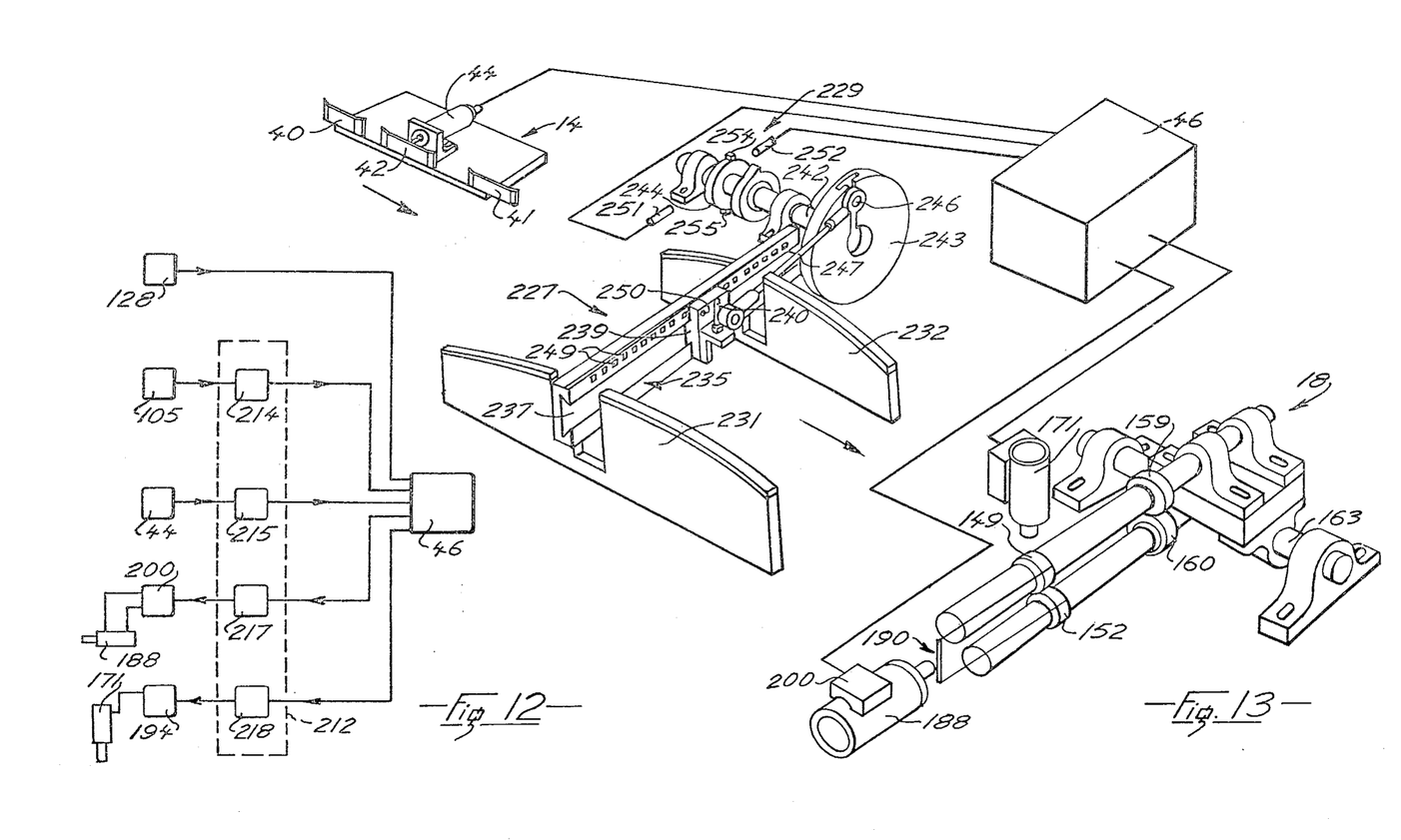
FIG. 12 is a simplified schematic showing basic electronic circuitry according to the invention.
FIG. 13 is a fragmented diagram of an alternative embodiment of the invention.

FIG. 12

The computer 46 is a digital computer, suitably a mini-computer PDP-11/05 with 8K of memory, as manufactured by Digital Equipment Corporation, of Maynard, Massachusetts, U.S.A. Such a computer has adequate memory and operating performance for operation of the apparatus.

An interface 212 connects the various inputs and outputs with the computer and includes first and second analog-to-digital (A/D) converters 214 and 215 connected to appropriate computer inputs, and first and second digital-to-analog (D/A) converters 217 and 218 connected to appropriate computer outputs.

The sensor 105 (FIGS. 6 and 7) of the bow detecting means 16 is an analog device which has an output connected to the first A/D converter 214. The back crown sensor 44 of the back crown gauge 14 (FIGS. 1 and 2) is also an analog device and has an output connected to the second A/D converter 215. The magnetic reed switch 128 of the edge detector 122 (FIGS. 6 and 7) is connected directly to the computer so that the internal clock of the computer is effectively restarted each time a pulse is received from the reed switch. As previously stated, the edge detector synchronizes signals from the sensor 105 with the edge datum of the saw so as to permit accurate determination of the start and finish of each particular traverse, and increments along each traverse. Signals from the A/D converters 214 and 215 are also synchronized with the computer clock so that a back crown reading of a particular portion of the saw can be synchronized to the bow reading of that particular portion. The internal clock also determines at what instant a particular bow reading from the sensor 105 is taken. As the sensor traverses across the saw in the zig-zag locus 130 (see FIG. 3) a bow reading from the sensor 105 is fed to the computer at intervals representing about one quarter of an inch increments across the width of the saw. Pulses from the edge detector determine the instants of reading the back crown sensor, several readings for each region being taken and averaged.

Thus the computer has inputs connected to the outputs of the bow detecting means and the back crown gauge, the outputs from the back crown gauge and the bow sensing means being synchronized for each particular portion of the saw. The computer is programmed to assess the existing pre-stress distribution in the saw from the synchronized outputs above, and to compare the assessed existing pre-stress distribution with a theoretical desired pre-stress distribution. The desired pre-stress distribution can be calculated from known physical parameters of the saw such as width and gauge, and also the shape of the former plates. The computer is programmed to compute the differences between the assessed existing pre-stress distribution and the desired pre-stress distribution. The difference between the assessed and desired distributions can be converted to an output signal for pressure and location of the rolls using internal logic decisions in the computer. The signals are stored in the computer memory and released to the tensioning means at appropriate moments, that is the signals are queued.

The assessed and desired pre-stress distributions above are based on bow profile and back crown values. As stated previously, absolute values of tensile and compressive residual stresses in the saw are not assessed by the present apparatus, but their relative distribution across the width and along the length of the saw is assessed or visualized by the bow profile and back crown readings. The computer is thus programmed effectively to control the tensioning means to produce in the saw the desired profile, as opposed to impart into the saw particular values of pre-stress or residual stress at particular locations. Throughout the claims, the term "pre-stress distribution" is thus based on the physical manifestations of the pre-stress distribution i.e. the bow profile and back crown, and does not relate to actual values. A brief analysis relating to pre-stress distribution in bandsaws is described in a paper by F. E. Allen, one of the inventors herein, entitled "Quality Control in the Timber Industry." This paper was published in September 1973 in the Australian Forest Industries Journal in Sydney, Australia.

The tensioning means 18 receives at the appropriate time the output signals from the computer, the signals representing a particular degree of rolling force to be applied to a particular portion of the saw, and is received by the servo valves controlling the two cylinders. The positioning servo valve 200 of the tensioning means is an analog device and has an input connected to the first D/A converter 217. The pressure servo valve of the tensioning means is an analog device and has an input connected to the second D/A converter 218. Thus the saw is tensioned automatically to change the existing pre-stress distribution in the saw to approach the desired computed pre-stress distribution.

OPERATION

Prior to working of the saw in the apparatus 10 of FIGS. 1 and 2, the saw has first been levelled or planished by known levelling apparatus. Levelling removes local blisters or bulges from the saw face and it is important that these be removed before tensioning. To fit the saw into the apparatus, the hinged outer posts of the roller mounts 70 and 71 of the blade forming means 17 (FIGS. 6 and 7) are swung down to provide clearance for lateral insertion of the saw thereinto. The reaction yoke 179 and the connecting member 187 of the tensioning means 18 (FIGS. 8 through 10) are positioned to accept the saw also laterally into the tensioning means. The saw is placed on the wheels 20 and 21 (FIGS. 1 and 2), spacing between which is adjusted by laterally sliding the spindles thereof. The wheels are positioned so that there is just sufficient tension in the saw for the saw to pass in a generally planar condition over the back crown gauge 14, and to be curved easily when passing over the forming means 17. The roller mounts 70 and 71 are then repositioned so that the rollers thereof nip the saw between the former plates and hold the saw snugly against the upper edges of the former plates. The magnets 90 augment retention of the saw to form it into the desired curve. The reaction yoke 179 and connecting means 187 of the tensioning means are reconnected and adjusted so that, with the feed pressure of about 200 pounds per square inch in the loading cylinder 171 and by rotation of the rolls 149 and 152 the saw can be traversed longitudinally through the apparatus 10. The feed or minimum holding pressure is adjusted so that there is no possibility of slip-page of the saw between the rolls, otherwise loss of synchronization with the back crown gauge and bow sensing means would result.

The computer program accepts such input parameters as saw gauge, saw width, desired pre-stress distribution etc. and then assesses the average existing pre-stress for each region in the saw and compares it with the desired pre-stress distribution. The program also computes the difference between the desired and existing pre-stress distributions and produces output signals to correct, or to reduce, the difference, based on the differences between the desired and existing back crowns and bow profiles.

The motor 156 is started so as to feed the saw longitudinally in the direction of the arrow 26. The bow detecting means 16 is started and the sensor 105 traverses across the saw in the zig-zag locus 130 and sends a series of signals reflecting bow of the saw at particular stations on each traverse. The readings from the back crown gauge are simultaneously fed into the computer and synchronized with bow readings. Note that initially no correcting signal, and only feed pressure, is fed to the loading cylinder 171. This is because, at start up a portion of the saw between the sensor 105 and the tensioning means 18 is passing through the tensioning means, and initially the pre-stress distribution of this portion is unknown. As previously stated the saw is divided electronically by the computer clock into the plurality of regions, two of which namely 132 and 133 are shown in FIG. 3. The length of the region has little relationship to the particular portion 65 of the saw being bowed but serves merely to divide the saw into convenient equal portions for an averaging process to be described. The region length must be no greater than spacing between the sensor and the rolls for reasons to be described.

As the sensor 105 traverses in the zig-zag locus 130 the output signal is read at a plurality of discrete spaced stations across each traverse so that at each traverse a series of readings reflecting spacing of the saw face from the face datum is obtained. The output signal of the bow sensor is taken at specific time intervals as determined by the computer clock and is stored in the computer memory. The positions of each station from an edge datum is known from the time relationship of the approximate simple harmonic motion of the sensor 105 and the speed of rotation of the crank means. This can be computed mathematically from formulae below.

Motion of the vertical sensor 105 along the true width 49 of the blade, designated W herein, can be approximately described as:

$$X = \frac{W}{2}(1 - \cos\omega t) + \frac{W^2}{8L}\sin^2\omega t \qquad (1)$$

where
  X = distance along blade width as measured from the back edge (datum) of the blade,
  $\omega$ = radian frequency of the wheel,
  t = time
  L = length of the connecting rod 116 of FIG. 6 as measured between centres.

The approximation shown in equation (1) gives sufficient accuracy for the actural parameters used in the apparatus.

The coordinates X(i) of the measuring stations are obtained from
  $X(i) = \text{OVERHANG} + (i-1) \times d \ldots (2)$
where $i$ varies from 1 to $n$
and
  $d$ = distance between stations,
  $n$ = total number of stations,
  OVERHANG = distance 141 as shown in FIG. 3. The overhang distance, which is typically of the order of 0.2 to 0.3 ins., is required so as to provide time for the computer to perform arithmetic and logic decisions at the end of each traverse of the sensor. If a higher speed computer were used, the overhangs could be eliminated.

Knowing X($i$) we can calculate the time TS($i$) taken by the vertical sensor to travel to individual stations, from Equation (1).

$$TS(i) = \frac{1}{\omega} \cos^{-1} \left[ \frac{2L}{W} \left\{ -1 + \sqrt{\left(1 + \frac{W}{2L}\right)^2 - \frac{2X(i)}{L}} \right\} \right] \qquad (3)$$

where $i$ varies from 1 to $n$.

Accumulation of errors resulting from approximations in the above formulae and other sources are rendered negligible by restarting the computer clock for each traverse of the sensor from the impulses from the edge detector.

Each region on the saw is determined by counting a predetermined number of traverses of the bow sensor by counting signals from the edge detector. Spacings between major components of the apparatus 10, that is between the back crown gauge 14 and the bow detector 16, and the bow detector and the tensioning means 18, are an integral or whole number multiple of region lengths so that length data of regions are established simultaneously at each major component. Thus, at a particular instant, the tensioning means has just completed rolling one region, the bow detecting means has just completed traversing another region and the back crown gauge has just completed assessing back crown of yet another region. Note that back crown readings are accepted in response to a signal from the edge detector at a frequency as required. In essence, region length is determined by the number and speed of bow sensor traverses and saw speed, and clearly a change in any one of these resulting in a change in region length would likely require changing spacing between major components of the apparatus 10. Thus position of the components on the bench 12 are preferably adjustable to permmit accurate positioning to attain the spacings of an integral number of region lengths.

When a particular region has just been traversed by the bow sensor, the tensioning rolls are released from the saw, thus stopping the saw. The data obtained from the traverses and the back crown readings for that particular region is processed to produce an average bow profile and back crown for that region. The averages are compared with the desired theoretical profile and back crown and the differences assessed. Note the back crown readings for that particular region were obtained some time before when that region passed the back crown gauge, and thus the back crown data is queued until required and is then synchronized with bow data from that region. The output signals from the computer represent a correcting rolling force to be applied at a computed location relative to the edge datum. With the rolls still released the rolls traverse the tensioning means to the computed location and are then forced together at the computed force. The rolls then roll that region at the computed loading for the complete length of the region. After the particular region has been rolled, pressure on the rolls is again released, thus causing the saw to stop. The rolls are then traversed to a new position and a new rolling force applied. In the above description it is preferable for the rolls to continue rotating when released from the saw, and the synchronization maintained by timing intervals when the rolls are subjected to feed pressure or greater pressures. Alternatively the rolls can be stopped before disengagement from the saw and restarted after engagement.

In the above description, the region length is equal to half of the space between the bow sensor and the tensioning rolls. This is adequate for the apparatus disclosed, but the regions could be shorter provided there were an integral number of regions between the major components. Clearly if the region length were longer than the space between the bow sensor and the tensioning rolls, the average bow reading would not have been assessed before a leading portion of that region entered the tensioning means, resulting in incomplete rolling of that region.

Time required for actuation of the positioning cylinder and the loading cylinder causes transient conditions to occur at the junctions between the regions, which results in short lengths of saw adjacent the length data being incorrectly rolled. This is immaterial because, when these particular incorrectly rolled portions return through the bow detecting means the length data will almost certainly be positioned differently. Thus the incorrectly rolled transient conditions will be detected and again rolled so as to more nearly approach the desired profile. Several passes of the saw might be needed to effect tensioning so that the transient conditions are essentially eliminated and the desired profile becomes within tolerance. In view of the requirement for successive elimination of transient conditions, it is essential that the length of the saw is not a whole number multiple of the region length, as this would then result in coincident length data for each successive pass of the saw. If this were the case transient conditions would not be eliminated and to avoid this difficulty the saw would have to be repositioned relative to the machine to reposition the length data.

ALTERNATIVES AND EQUIVALENTS

Several alternative embodiments which are within the concept of the invention can be envisaged. Alternative sensors can be used to detect back crown and bow of the saw and alternative tensioning means can be used employing alternative feedback methods to ensure correct positioning of the rolls and application of the computed force. With reference to FIGS. 1 and 2, it can be seen that the back crown gauge detects back crown of a portion of the saw held flat and spaced upstream from the bow detecting means 16. Clearly, the gauge 14 could be downstream from the means 16, that is between the means 16 and the means 18. Also by changing the computer program, the back crown gauge could be positioned on the blade forming means 17, that is the back crown gauge could be aligned with the bow sensor traverse to measure back crown on a curved portion of the saw simultaneously with the bow readings for the same region. This would facilitate some aspects of synchronizing bow and back crown readings.

FIG. 13

The back crown gauge 14 and the tensioning means 18 are shown in combination with an alternative bow detecting means 227 and an alternative edge detector 229. The alternative bow detecting means 227 has a pair of spaced former plates 231 and 232 having convex upper surfaces of known geometry against which the saw (not shown) is urged by roller mounts (not shown), similarly to the mounts 70 and 71 of FIGS. 6 and 7. A transverse arm 235, fitted in slots in the plates, extends between the former plates and is positioned adjacent to the saw on a concave lower surface thereof. One side of the arm has a dovetailed-sectioned groove 237 and an alternative sensor carriage 239 is mounted on the arm, having a complementary dovetail which is accepted in the groove. Thus the dovetail groove serves as a track means for the carriage 239 and is equivalent to the track means, that is the rails 99 and 100, of FIGS. 6 and 7. The carriage 239 carries a vertical sensor 240 equivalent to the vertical sensor 105 of FIGS. 6 and 7. The means 227 has a crankshaft 242 powered for rotation by means not shown, the shaft carrying at one end thereof a crank disk 243 and at the opposite end a detector disk 244. The disk 243 has a radial slot therein carrying a radially adjustable crankpin 246 providing a variable crankthrow similarly to the crank means 107. A connecting rod 247 extends between the crankpin and the carriage so the rotation of the disk 243 reciprocates the sensor carriage 239 across the saw similarly to the crank means 107.

A plurality of sensors 249 are spaced at equal increments along the arm and an actuating means 250 on the carriage sweeps the sensors with each stroke. The sensors 249 are responsive to the position of the carriage 239 relative to the edge datum and are connected to the computer via a suitable interface to provide an edge datum measurement. The sensors can be photoelectric cells or a photodiode linear array which are normally exposed to light. When the carriage or means 250 interrupts the light incident on one or more sensors, a signal is generated which reflects the vertical sensor 240 position relative to the edge datum. This signal is fed into the computer which concurrently accepts a signal from the vertical sensor 240 reflecting spacing of the saw from the face datum. Thus the signals provide two coordinates relative to the face and edge data to reflect bow of the saw. When each sensor 249 is keyed to a particular horizontal location relative to the edge data, an edge detector is usually required as the computer cannot always detect when a reading is adjacent the edge datum, that is it cannot always detect the last, or first, reading of a traverse. The sensors 249 thus serve as a horizontal sensor, i.e. they reflect the position of the vertical sensor on a horizontal axis. The detector disk 244 rotates between a pair of diametrically opposed proximity switches 251 and 252, the disk carrying a pair of diametrically opposed magnets 254 and 255 which actuate the switches. The magnets are spaced on the disk relative to the crank means so as to actuate the switches when the sensor is at extreme positions of its stroke. Such an arrangement is basically similar and equivalent to the arrangement of the edge detector 122.

A further alternative horizontal sensor could be a potentiometer type having a range equal to at least the maximum stroke of the sensor carriage along the arm. The potentiometer could be a rotary transducer rotated by a loop of drive belt coupled to the carriage and passing around a pulley fixed to the arm. The potentiometer would have a voltage signal output proportional to the position of the carriage relative to edge data. With such an arrangement an edge interrupt mechanism would likely be redundant, as the potentiometer would automatically detect the end, or beginning, of a stroke.

The tensioning means 18 is shown schematically with only a few major components annotated and is basically similar to the tensioning means as previously described. Note that the positioning cylinder 188 is shown connected by simplified schematic means to the rolls 149 and 152.

Note that the present structure discloses an apparatus and method which assesses an existing average pre-stress distribution for each region of the saw. Clearly, the shorter the length of the region, the finer the "resolution" of the bow detection means. That is, the more sensitive the average will be to variations in stress distribution within adjacent portions of the saw. However, the shorter the regions, the greater would be the proportion of sensor readings relating to the undesirable transient conditions to the total readings for the region, other factors remaining constant. Thus, the finer resolution to be gained by decreasing region length would be offset by increasing errors due to transient conditions. These errors could be reduced by using interface components and transducers which have sufficiently fast responses, but advantages here could be lost by computer limitations. If response of all the electronic components could be increased sufficiently the region length would be limited only by spacing between adjacent traverses, so that the bow detector would then detect bow at the spacing between adjacent traverses, perhaps one inch. Thus the averaging process is essentially eliminated and the computer output for the rolling force and a roll position would be based on each traverse. It is considered that a resolution of less than 1 inch is unnecessary as a blade is a continuum and changes of pre-stress distribution are relatively gradual so that fluctuations from one extreme condition to the opposite occur over a few inches of blade, which would be within the resolution above.

We claim:

1. An apparatus for automatically roll tensioning a saw having a longitudinal axis and an effective width defined by space between edge data of the saw, the saw being adapted to be fed along the longitudinal axis, the device including:
   i. support means to mount the saw to permit movement of the saw along the longitudinal axis,
   ii. blade forming means adapted to form a selected portion of the saw into a known curve, existing pre-stress distribution in the saw causing the selected portion of the saw to bow across the width thereof relative to a face datum to assume a bowed profile,
   iii. bow detecting means adapted to detect bow of the selected portion of the saw relative to the face datum, the detecting means having an output responsive to position of the saw face relative to the edge and face data so as to reflect existing pre-stress distribution local to the selected portion of the saw based on the actual saw profile at that portion;
   iv. a back crown gauge cooperating with one edge of a portion of the saw so as to measure back crown at that portion of the saw, the back crown gauge including a back crown sensor having an output reflecting back crown of the saw,
   v. a computer having an input connected through an interface to the outputs of the bow detecting means and the back crown gauge, the output from the back crown gauge being synchronized with the output from the bow sensing means for that particular portion of the saw; the computer being programmed to assess existing pre-stress distribution in that portion of the saw based on the bow profile and back crown, and to compare the assessed pre-stress distribution with a theoretical desired pre-stress distribution based on a desired bow profile and back crown, so as to produce an output reflecting the difference between the assessed and desired pre-stress distributions based on differences between actual and desired bow profiles and back crowns, vi. tensioning means cooperating with the saw, the tensioning means having an output connected through an interface to the output of the computer so as to receive signals from the computer representing a particular degree of rolling force to be applied to that particular portion of the saw, at a position on the saw relative to the edge data, so as to change the existing pre-stress distribution in the saw to approach the desired pre-stress distribution.

2. An apparatus as claimed in claim 1 in which:
i. the saw has a plurality of regions of equal length as determined by the computer, length of each region being defined by space between respective adjacent length data spaced along the saw,
ii. feed means synchronized with the computer cooperates with the saw to feed the saw at a constant linear speed so that the saw passes the bow detecting means at a constant speed for a particular region,
iii. the tensioning means is spaced along the saw longitudinal axis from the bow detecting means and the back crown gauge a distance no less than the length of a region,
iv. the computer has a memory so that the outputs from the bow detecting means and the back crown gauge reflecting existing pre-stress distribution for a particular region can be stored in the computer memory until that particular region of the saw enters the tensioning means,
v. the tensioning means is synchronized with the respective region of the saw so that, at a particular instant, that region of the saw is roll tensioned according to the signals received from the computer.

3. An apparatus as claimed in claim 1 in which the bow detecting means includes:
i. a bow sensor adapted to traverse the saw generally across the width thereof simultaneously with longitudinal movement of the saw, so that the sensor describes a zig-zag locus adjacent the face of the saw, the sensor having an output reflecting spacing of the face of the saw relative to the face datum,
ii. an edge detector cooperating with the bow sensor and being responsive to edge data of the saw so as to maintain synchronization of the bow sensor output with the edge data by providing accurate time data for the computer.

4. An apparatus as claimed in claim 1 in which:
i. the forming means is adapted to form the saw into an arc centered on a horizontal axis so that the saw bows vertically from the saw face datum, which datum is a horizontal axis disposed normally to the longitudinal axis of the saw,
and the bow detecting means includes:
ii. a vertical sensor to detect, at a particular station on the saw, spacing between the saw face and the face datum, and
iii. a horizontal sensor to provide a means of assessing distance of the vertical sensor from the saw edge datum at each particular station,
the output from the bow detecting means including signals from both sensors which are fed into the computer.

5. An apparatus as claimed in claim 4 in which the bow detecting means is also characterized by:
i. track means extending transversely across the saw,
ii. a carriage mounted on the track means, the vertical sensor being mounted on the carriage for transverse movement across the width of the saw,
iii. a crank means mounted for rotation about a crank axis, the crank means having a crank pin and a connecting rod, the rod cooperating with the carriage and the crank pin so that rotation of the crank means causes the carriage to reciprocate along the rails,
iv. the horizontal sensor including an edge detector which is responsive to edge data of the saw so as to maintain synchronization of the sensor output with the edge data by providing accurate time data for the computer.

6. An apparatus as claimed in claim 5 in which space between the crank pin and the crank axis is adjustable to vary throw of the crank means and thus to vary stroke of the carriage to accommodate saws of different widths.

7. An apparatus as claimed in claim 1 in which the tensioning means includes:
i. first and second cooperating tensioning rolls spaced to accommodate the saw therebetween, the rolls being generally coplanar and journalled to rotate about respective roll axes normal to the saw longitudinal axis, the first roll being mounted for generally radial movement relative to the second roll to vary spacing between the rolls,
ii. roll traversing means cooperating with the pair of rolls to traverse the rolls along the respective roll axes to obtain a computed position of the rolls on the width of the saw relative to the saw edge datum, the traversing means having a signal input to receive a signal from the computer reflecting the computed position,
iii. roll loading means to apply a computed force to the first roll to urge the rolls radially together under the computed force, the loading means having a signal input to receive a signal from the computer reflecting the computed force.

8. An apparatus as claimed in claim 7 in which the tensioning means includes:
i. first and second spindles extending normally across the saw to mount the first and second tensioning rolls, at least one spindle being powered so as to rotate the respective roll to serve as feed means for feeding the saw longitudinally, the rolls being slideable along the spindles to attain the computed position relative to the edge data in which the saws are coplanar,
and the roll traversing means includes:
ii. an extensible and retractable hydraulic fluid actuated positioning cylinder having a piston rod extending normally relative to the saw longitudinal axis, the piston rod cooperating with the rolls to traverse the rolls simultaneously when the cylinder is actuated, the cylinder having a fluid input,
iii. a positioning servo valve connected to the positioning cylinder input, the valve being adapted to receive a signal from the computer reflecting the computed position of the rolls relative to the width of the saw as determined by the computer,
iv. a position feedback system including a feedback transducer cooperating with the piston rod to generate a feedback signal reflecting roll position, the signal effectively actuating the positioning servo valve to control the positioning cylinder so that the rolls more nearly approach the desired position, and the roll loading means includes:
  v. an extensible and retractable hydraulic fluid actuated loading cylinder having a piston rod cooperating with the first roll to move the first roll generally radially relative to the second roll to vary force between the rolls, the loading cylinder having a fluid input and being moveable transversely across the saw with the first roll,
  vi. a pressure servo valve connected to the input of the loading cylinder, the valve being adapted to receive a signal from the computer reflecting the computed force to be applied to the roll,
  vii. a pressure feedback system including a pressure transducer exposed to fluid pressure within the loading cylinder to generate a feedback signal reflecting fluid pressure, the signal effectively actuating the pressure servo valve to control the loading cylinder so that the first roll more nearly applies the desired force.

9. An apparatus as claimed in claim 8 in which:
  i. the first spindle is mounted so as to permit swinging of the first spindle relative to the second spindle in a plane generally normal to the longitudinal axis of the saw and generally normal to a plane face of the saw, the second spindle being journalled parallel to the plane of the saw face, both spindles being powered and keyed to respective rolls,
  ii. support means extending normally across the width of the saw, the support means having first and second roll beds extending adjacent and parallel to the first and second spindles respectively, the support means also having a loading cylinder bed disposed parallel to the roll beds and adjacent a vertical plane containing the spindles,
  iii. first and second spaced roll carriages cooperating with the first and second rolls and mounted for sliding on the first and second roll beds respectively, so that sliding the roll carriages along the beds slides the rolls axially along the spindles, the spindles being journalled in the respective carriages to transfer radial loads between the rolls and the respective beds, the ram of the loading cylinder cooperating with the first carriage, the ram of the positioning cylinder cooperating with the second carriage,
  iv. coupling means extending between the roll carriages so that the carriages can slide simultaneously and move the rolls and maintain the rolls coplanar, the coupling means providing clearance for the saw to pass between the rolls and carriages,
so that actuation of the positioning cylinder moves the second carriage and roll, which movement, through the coupling means is transferred to the first carriage and roll, which movement moves the loading cylinder transversely along the loading cylinder bed.

10. An apparatus as claimed in claim 3 in which the computer is a digital computer and in which the apparatus includes a digital computer interface including:
  i. first and second analog-to-digital converters connected to appropriate computer inputs,
  ii. first and second digital-to-analog converters connected to appropriate computer outputs,
and in which the apparatus is further characterized by:
  iii. the tensioning means has a pressure servo valve controlling amount of rolling force to be applied to the rolls, and a positioning servo valve to control position of the rolling force relative to the saw edge data,
  iv. the tensioning means also including a pressure feedback transducer which generates a feedback signal reflecting rolling force; and a position feedback transducer which generates a feedback signal reflecting position of rolling force,
  v. the bow sensor of the bow detecting means is an analog device which has an output connected to the first analog-to-digital converter,
  vi. the back crown gauge has a sensor which is an analog device having an output connected to the second analog-to-digital converter,
  vii. the positioning servo valve of the tensioning means is an analog device and has an input connected to the first digital-to-analog converter and is adapted to receive signals reflecting output from the position feedback transducer,
  viii. the pressure servo valve of the tensioning means is an analog device and has an input connected to the second digital-to-analog converter and is adapted to receive signals reflecting output from the pressure feedback transducer.

11. A method of automatically roll tensioning a saw blade, the saw having a longitudinal axis and an effective width defined as space between edge data of the saw, the method including steps of:
  i. forming, in sequence, selected portions of the saw into a known curve having an axis normal to the longitudinal axis of the saw so that existing pre-stress distribution in the saw causes the selected portion of the saw to bow across the width thereof to assume a bowed profile relative to a face datum,
  ii. detecting in sequence the bowed profile relative to the saw face datum for that particular portion of the saw and obtaining a series of bow readings reflecting the bowed profile,
  iii. detecting back crown of the saw at each selected portion of the saw and obtaining back crown readings of the saw,
  iv. synchronizing and combining the bow and back crown readings to assess existing pre-stress distribution in the saw, based on the bow and back crown readings,
  v. comparing in an electronic computer the assessed existing pre-stress distribution in the saw with a desired pre-stress distribution based on a desired bow profile and back crown, and obtaining an indication of the deviation of the assessed distribution from the desired distribution.
  vi. performing a series of logic decisions based on the desired and assessed prestress distributions to determine a computed position and a computed roll tensioning force required to work the saw more toward the desired distribution,
  vii. producing at an appropriate time from the computer signals reflecting the computed position and degree of roll tensioning required, and feeding the signals to a roll tensioning means,
  viii. automatically roll tensioning the saw where required with the rolling force required so as to impart a new pre-stress distribution in the saw which approaches the desired pre-stress distribution.

12. A method as claimed in claim 11 in which the method is further characterized by averaging the bow profile of the saw by the steps of:
  i. feeding the saw at a constant speed past sensors adapted to measure the bow and the back crown of the saw, ii. accepting readings from the sensors for sequential equal time periods thus effectively dividing the saw electronically into a plurality of regions of known and equal length, iii. traversing a bow sensor across the saw at a plurality of traverses extending between edge data of the saw and spaced along the length of each region to obtain a plurality of spaced bowed profiles for each region; each reading from the bow sensor being at a specific time interval to reflect, at a particular station on the saw, spacing of the saw face from the face datum, iv. synchronizing the output from the bow sensor by detecting edge data of the saw, thus permitting accurate assessment of the spacing of each station relative to the edge data, v. averaging in the computer the readings obtained for that particular region, by averaging for each station the signals obtained from the sensor for the plurality of traverses, thus obtaining an average saw profile for that region.

13. A method as claimed in claim 12 further characterized by:

i. accepting a plurality of readings of back crown of the saw for each region, ii. averaging the back crown readings for each region to obtain an average back crown for each region, iii. combining the average back crown reading with the average bow reading to attain an average prestress distribution for that region.

14. A method as claimed in claim 12 in which the method is further characterized by:

i. accepting bow and back crown readings relating to at least one region simultaneously with the roll tensioning of another region, in which the commencement and termination of acceptance of the readings from one region occurs simultaneously with the commencement and termination respectively of the roll tensioning of the other region.

15. An apparatus as claimed in claim 2 in which:

i. spacing between the tensioning means and the bow detecting means, and spacing between the tensioning means and the back crown gauge are whole number multiples of the length of a region, so that, as the saw feeds through the apparatus, commencement and termination of acceptance of the readings from one region occurs simultaneously with the commencement and termination respectively of the roll tensioning of another region.

* * * * *